C. O. STENSRUD.
HARROW.
APPLICATION FILED SEPT. 22, 1917.

1,280,894.

Patented Oct. 8, 1918.
3 SHEETS—SHEET 1.

WITNESSES

INVENTOR
C. O. Stensrud,
BY Victor J. Evans
ATTORNEY

C. O. STENSRUD.
HARROW.
APPLICATION FILED SEPT. 22, 1917.

1,280,894.

Patented Oct. 8, 1918.
3 SHEETS—SHEET 2.

WITNESSES

INVENTOR
C. O. Stensrud,
BY Victor J. Evans
ATTORNEY

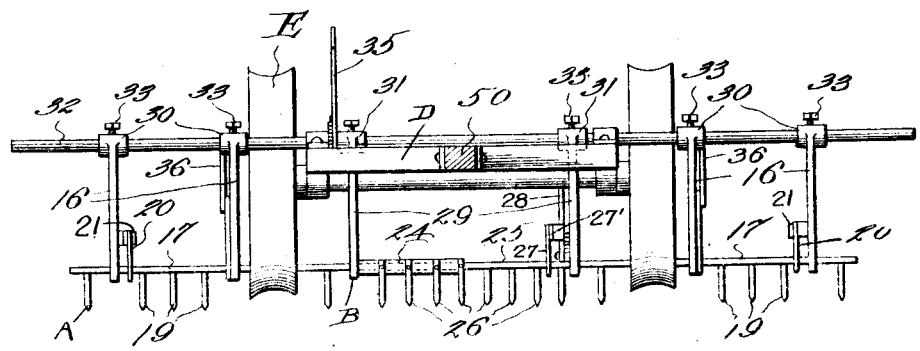
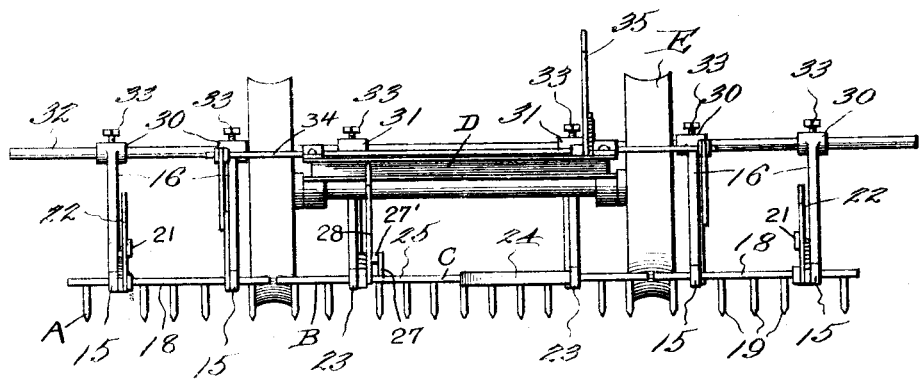

UNITED STATES PATENT OFFICE.

CHARLES O. STENSRUD, OF PETERSBURG, NEBRASKA.

HARROW.

1,280,894.     Specification of Letters Patent.     Patented Oct. 8, 1918.

Application filed September 22, 1917. Serial No. 192,746.

*To all whom it may concern:*

Be it known that I, CHARLES O. STENSRUD, a citizen of the United States, residing at Petersburg, in the county of Boone and State of Nebraska, have invented new and useful Improvements in Harrows, of which the following is a specification.

This invention relates to harrows and it has particular reference to a harrow which will be adapted to be applied to and used in connection with a corn planter for the purpose of agitating and leveling the soil at the time of planting thereby greatly minimizing the danger of the seed being washed out of the ground by heavy rains occurring shortly after the time of planting as is extremely liable to happen in the corn belt of the United States as well as other corn raising countries.

The invention has for its object to produce a simple, compact and inexpensive improved harrow structure which will be particularly adapted to be attached to a corn planter and which, when so applied may be adjusted and manipulated in any requisite and desirable way.

A further object of the invention is to produce a harrow attachment for corn planters which may be readily adjusted to operate successfully when the corn rows are spaced variously apart, the harrow being composed of sections which may be easily and quickly adjusted and variously spaced apart.

With these and other ends in view which will readily appear as the nature of the invention is better understood, the same consists in the improved construction, arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Fig. 5 is a front elevation showing the harrow applied to a corn planter.

Fig. 6 is a rear elevation of the same.

Corresponding parts in the several figures are denoted by like characters of reference.

Figure 1:
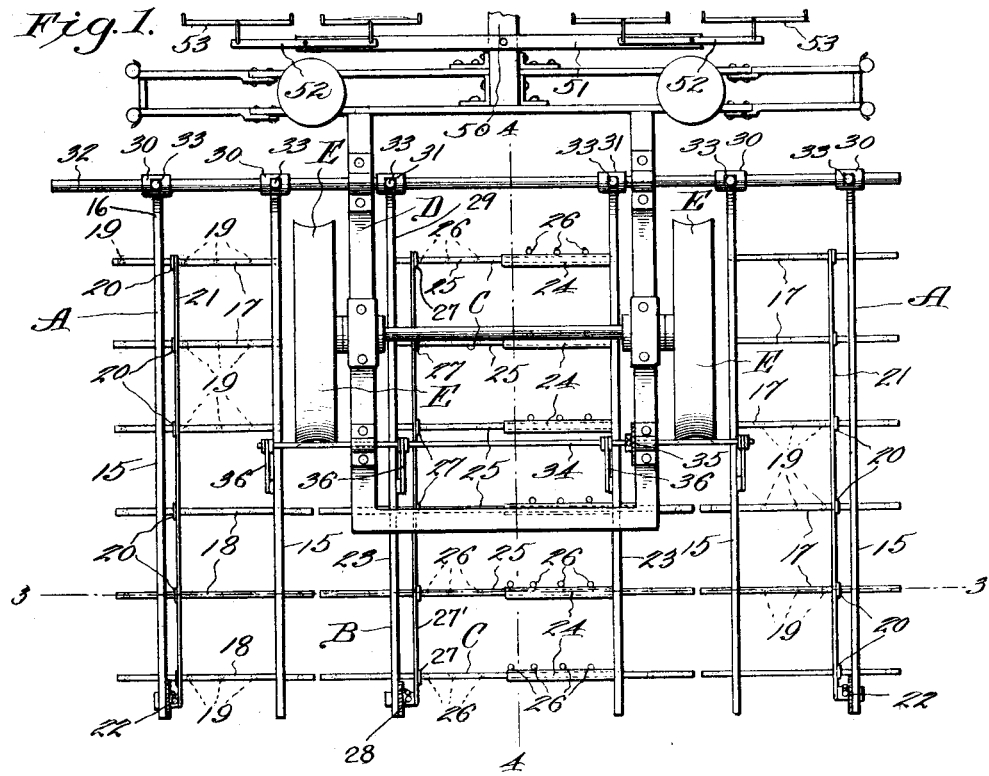
Figure 1 is a top plan view of a harrow constructed in accordance with the invention.
Figure 2:
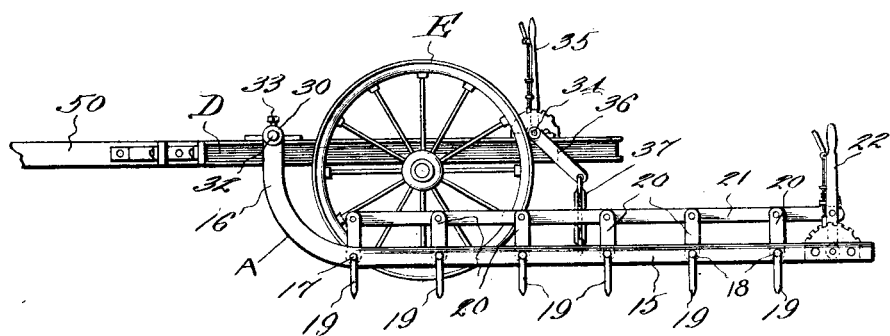
Fig. 2 is a side elevation of the same.
Figure 3:
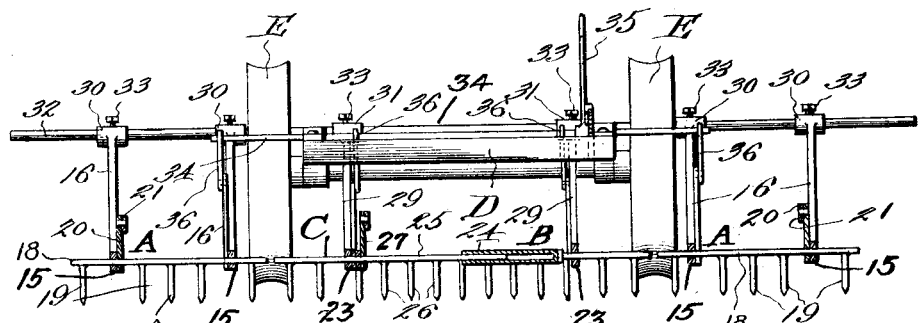
Fig. 3 is a sectional view taken on the line 3—3 in Fig. 1.
Figure 4:
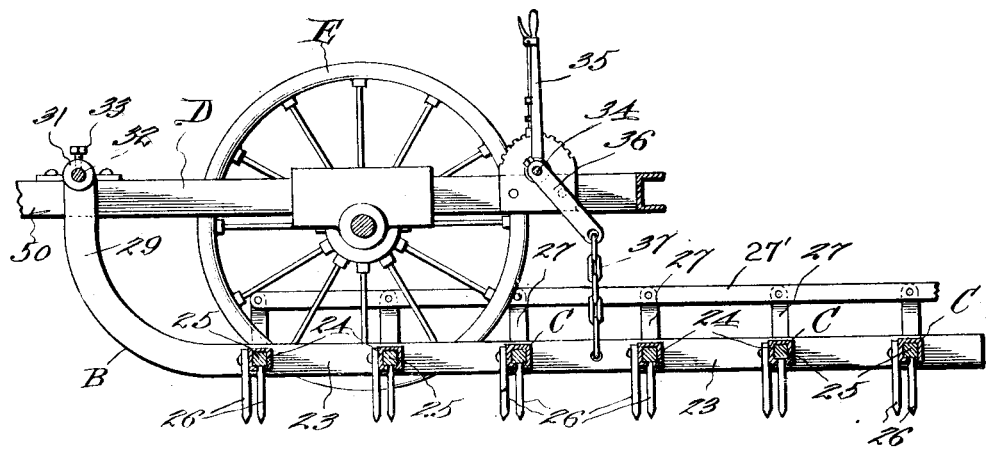
Fig. 4 is a sectional view taken on the line 4—4 in Fig. 1.

The improved harrow is made up of a plurality of sections comprising two outer sections A, A and an inner or intermediate section B.

Each outer section is made up of two side members or side bars 15 having upwardly extending arms or brackets 16 at their front ends. The side bars 15 support a plurality of rocking teeth carrying bars 17 and 18, the bars 17 being located near the forward end of the harrow frame and the bars 18 near the rearward end thereof, the only difference being that the rearward bars are extended materially beyond the side members 15 at the inner sides of the frame A while both the front bars 17 and the rear bars 18 are extended a short distance beyond the side members 15 at the outer sides of the frames A. The bars 17 and 18 are each provided with ground engaging teeth 19 which may be of any desired construction and secured in any convenient well known manner. The frame bars 17 and 18 are provided with uprights 20 connected together by a link bar 21 which may be operated by an adjusting lever 22 for the purpose of tilting the rocking bars 17 and 18 so as to present the teeth at any desired angle or inclination with respect to the ground.

The middle or intermediate harrow section B is composed of side members 23 in which rocking bars C are supported, each of said rocking bars being composed of a tubular member 24 and a rod 25 telescoping therein. The rods 25 are preferably square or of non-circular cross section so as to be incapable of rotating in the tubular members 24 the bores of which are correspondingly shaped, and the rods 25 as well as the tubular members 24 are equipped with ground engaging teeth 26. The rocking bars C are provided with uprights or arms 27 which may be applied either to the tubular members 24 or to the rods 25, the latter construction being illustrated in the drawings. A hand lever 28 is provided to effect rocking adjustments of the bars C to present the teeth at the desired angle or inclination with respect to the ground. A bar 27' connects the arms 27 with lever 28. The side members 23 of the frame B are provided at their forward ends with upwardly extending arms or brackets 29, corresponding with the bracket 16 of the side members 15 of the frames A.

The upturned brackets 16 and 29 are provided at their upper ends with horizontally disposed sleeves 30, 31 engaging a rod or draft bar 32 on which the said sleeves may be secured in adjusted position by means of set screws 33 or other equivalent fastening means. It will be evident that the intermediate frame B may be expanded or collapsed by simply moving or adjusting the sleeves 31 on the bar 32 and that the frames A may be adjusted lengthwise of the rod or draft bar 32 in a similar manner.

The rod or draft bar 32 is to be mounted in any convenient manner on the forward part of the planter frame which latter is indicated at D. Supported on the rearward part of the planter frame is a rock shaft 34 operable by a hand lever 35 and having radial arms 36 which are to be connected by flexible elements such as chains 37 with the rearward parts of the harrow frames A and B. The wheels E of the planter will operate between the forward end portions of the frames A and B where ample room is provided for said wheels without interfering with the rocking teeth carrying bars owing to the fact that the forward tooth carrying bars of the respective frames are not extended beyond the side bars of the frame B nor beyond the inner side bars 15 of the frames A.

When the harrow is mounted on a corn planter in the manner shown and described the harrow teeth, having been adjusted to any desired angle, may be made to engage the ground to any desired depth by proper adjustment of the rocking shaft 34. By manipulation of said rock shaft 34 the rearward portions of the harrow frames may be elevated to such an extent as to practically raise the harrow teeth from ground engaging position. Rocking tooth carrying bars of the several harrow frames may be independently adjusted to present the teeth at the desired angle with respect to the ground. The intermediate harrow frame B may be collapsed and expanded and the outer harrow frames A may be adjusted lengthwise of the supporting rod or bar 32 so as to fit the harrow attachment to corn planters which are arranged to plant the corn in rows different distances apart. The improved harrow attachment is of very simple and inexpensive construction and it will be found thoroughly useful for the purpose of stirring and leveling the soil at the time of planting in a manner which is extremely effective in preventing the seed from being washed out by heavy rains. In Fig. 1 of the drawings the corn planter, the frame of which is indicated at D, has been shown as being equipped with a tongue 50 on which is mounted a four-horse equalizer 51 including doubletrees 52 and swingletrees 53, thus enabling four draft animals to be conveniently employed and enabling the harrowing and planting to be performed at a single operation and by one operator, thereby saving the work of one man.

What is claimed, is:—

1. A harrow attachment for corn planters comprising two outer sections and an intermediate collapsible section, each of said sections having side bars with upturned brackets at their front ends and sleeves carried by said brackets, said sleeves being horizontally disposed in substantially axial alinement, in combination with a draft bar on which said sleeves are adjustably mounted to permit collapsing of the intermediate section and adjustment of the outer sections relatively to the intermediate section.

2. A harrow attachment for corn planters comprising two outer sections and an intermediate collapsible section, each of said sections having side bars with upturned brackets at their front ends and sleeves carried by said brackets, said sleeves being horizontally disposed in substantially axial alinement, in combination with a draft bar on which said sleeves are adjustably mounted to permit collapsing of the intermediate section and adjustment of the outer sections relatively to the intermediate section, each of said harrow sections having rocking tooth carrying bars and means for adjusting the same.

3. A harrow attachment for corn planters comprising two outer sections and a collapsible intermediate section, and a draft bar with which the several sections are adjustably connected, said outer sections having front and rear rocking tooth carrying bars, the front tooth carrying bars terminating even with the inner frame bars of said outer harrow sections, and the intermediate collapsible section having front and rear rocking tooth carrying bars, the front ones of which terminate even with the side bars of said intermediate section to provide open spaces in which the wheels of a corn planter may operate.

4. A harrow attachment for corn planters comprising two outer sections and a collapsible intermediate section each of said sections having side bars with upturned brackets carrying horizontally disposed sleeves, and a draft bar on which said sleeves are adjustably mounted, said collapsible harrow section comprising side members and rocking tooth carrying bars mounted therein, each of said rocking tooth carrying bars comprising a tubular member and a rod telescoping therein.

In testimony whereof I affix my signature.

CHARLES O. STENSRUD.

Copies of this patent may be obtained for five cents each, by addressing the "Commissioner of Patents, Washington, D. C."